United States Patent
Saari et al.

(10) Patent No.: US 12,395,100 B2
(45) Date of Patent: Aug. 19, 2025

(54) COMBINATION PIEZOELECTRIC ACTUATOR AND SENSOR

(71) Applicant: MTS Systems Corporation, Eden Prairie, MN (US)

(72) Inventors: Byron John Saari, Minneapolis, MN (US); Scott Gale Johnson, Waconia, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 456 days.

(21) Appl. No.: 17/438,817

(22) PCT Filed: Nov. 4, 2019

(86) PCT No.: PCT/US2019/059688
§ 371 (c)(1),
(2) Date: Sep. 13, 2021

(87) PCT Pub. No.: WO2020/093054
PCT Pub. Date: May 7, 2020

(65) Prior Publication Data
US 2022/0131479 A1   Apr. 28, 2022

Related U.S. Application Data

(60) Provisional application No. 62/755,508, filed on Nov. 4, 2018.

(51) Int. Cl.
*G01N 3/36* (2006.01)
*G01N 3/38* (2006.01)
(Continued)

(52) U.S. Cl.
CPC ................ *H02N 2/04* (2013.01); *G01N 3/36* (2013.01); *G01N 3/38* (2013.01); *H02N 2/183* (2013.01);
(Continued)

(58) Field of Classification Search
CPC .. G01N 3/32; G01N 3/36; G01N 3/38; G01N 2203/0048; G01N 2203/0051; G01N 2203/0623; H02N 2/04; H02N 2/183
See application file for complete search history.

(56) References Cited

U.S. PATENT DOCUMENTS 5,856,620 A   1/1999   Okada
6,209,382 B1  4/2001   Komata et al.
(Continued)

FOREIGN PATENT DOCUMENTS

CN   2090527 U    12/1991
CN   101868260 A  10/2010
(Continued)

OTHER PUBLICATIONS

International Search Report and Written Opinion for corresponding International Application No. PCT/US2019/059688 dated Feb. 19, 2020.
(Continued)

*Primary Examiner* — Natalie Huls
(74) *Attorney, Agent, or Firm* — Steven M. Koehler; Westman, Champlin & Koehler, P.A.

(57) ABSTRACT

A test system includes a frame. A hydraulic actuator is mounted to the frame and is configured to support a test specimen. A piezoelectric actuator is configured to apply a force to the test specimen. A controller is configured to excite the piezoelectric actuator and provide an indication of force generated by the piezoelectric actuator by measurement of current or charge provided to the piezoelectric actuator.

19 Claims, 2 Drawing Sheets

(51) Int. Cl.
*H02N 2/04* (2006.01)
*H02N 2/18* (2006.01)
(52) U.S. Cl.
CPC ............. *G01N 2203/0048* (2013.01); *G01N 2203/0051* (2013.01); *G01N 2203/0623* (2013.01)

(56) References Cited

U.S. PATENT DOCUMENTS

| | | | |
|---|---|---|---|
| 6,561,019 | B1 | 5/2003 | Kossat et al. |
| 6,813,960 | B1 | 11/2004 | Owen et al. |
| 7,331,209 | B2 | 2/2008 | Saari et al. |
| 8,252,416 | B2 | 8/2012 | Jun et al. |
| 9,658,122 | B2 | 5/2017 | Saari et al. |
| 2006/0056832 | A1 | 3/2006 | Yamaguchi et al. |
| 2006/0070424 | A1 | 4/2006 | Saari et al. |
| 2010/0066423 | A1 | 3/2010 | Inukai et al. |
| 2016/0202160 | A1* | 7/2016 | Saari .................. G01N 3/02 73/788 |
| 2016/0245733 | A1* | 8/2016 | Cerutti ................ G01N 3/38 |

FOREIGN PATENT DOCUMENTS

| | | | | |
|---|---|---|---|---|
| DE | 10022759 | A1 * | 11/2001 | ............. B60T 13/74 |
| JP | S5918429 | A | 1/1984 | |
| JP | H08285753 | A | 11/1996 | |
| JP | 2000-510595 | A | 8/2000 | |
| JP | 3429322 | B2 | 7/2003 | |
| JP | 2008-164495 | A | 7/2008 | |
| JP | 2008-285753 | A | 11/2008 | |
| JP | 2009-258900 | A | 11/2009 | |
| JP | 2009-280974 | A | 12/2009 | |
| JP | 2010-014404 | A | 1/2010 | |
| JP | 2013-019768 | A | 1/2013 | |
| WO | 199837400 | A1 | 8/1998 | |
| WO | 2009101566 | A1 | 8/2009 | |

OTHER PUBLICATIONS

Furutani et al. "Estimation of Generative Force of Piezoelectric Actuator by Using Driving Current", Journal of the Japan Society for Precision Engineering, 2015, pp. 875-880, vol. 81, No. 9.
Office Action in corresponding European patent application No. 19809340.3 dated Sep. 6, 2023.
Office Action in corresponding Japanese patent application No. 2021-523905 dated Oct. 19, 2023.
Office Action in corresponding Chinese patent application No. 201980073048.6 dated Apr. 18, 2024.
Final Office Action in corresponding Japanese patent application No. 2021-523905 dated May 10, 2024.
Office Action in corresponding Chinese patent application No. 201980073048.6 dated Sep. 28, 2024.
Office Action in corresponding Korean patent application No. 10-2021-7016649 dated Nov. 20, 2024.

* cited by examiner

COMBINATION PIEZOELECTRIC ACTUATOR AND SENSOR

The present application is a Section 371 National Stage Application of International Application No. PCT/US2019/059688, filed Nov. 4, 2019 and published as WO 2020/093054 A1 on May 7, 2020, in English, and further claims priority to U.S. provisional patent app. Ser. No. 62/755,508, filed Nov. 4, 2018.

BACKGROUND

The discussion below is merely provided for general background information and is not intended to be used as an aid in determining the scope of the claimed subject matter.

For testing of components or materials, such as elastomer materials or parts, it is often desirable to measure the force response of the material to a motion input excitation. The measured force divided by the excitation displacement is referred to as the dynamic stiffness. The phase relationship between the force and displacement is also an important characteristic for the material and component properties. This dynamic stiffness measurement or characterization is often performed with very high frequency excitations. An example is for characterizing the dynamic stiffness and transmissibility for automotive motor mounts. Common excitation frequencies for internal combustion engine motor mount testing is from 0.01 Hz to 1,000 Hz. This type of testing is often performed with servo-hydraulic test equipment. Higher frequency dynamic stiffness measurements up to 2.000 Hz or even 3.000 Hz frequency is becoming more desirable with a more concentrated focus on noise, vibration and harshness (NVH) in the automotive manufacturing industry due to consumers higher NVH expectation combined with the influence of the quieter electric vehicles. Servo-hydraulic actuation technology becomes less efficient and more complicated at frequencies above 1,000 Hz. The compliance of the hydraulic oil makes it difficult to realize sizable motions above 1000 Hz.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

This disclosure proposes an alternative piezoelectric (PE) actuation technology particularly advantageous for higher (>1,000 Hz) excitation frequencies. Piezoelectric (PE) actuators have been used for higher frequency dynamic stiffness measurement/characterization testing. One disadvantage of the PE technology is that it typically is not feasible for low frequency testing such as less than 80 Hz. This is probably due to the limited stroke/displacement achievable from a PE actuator. One aspect of the invention is using PE actuators in combination with hydraulic actuation technology to achieve a testing system which can test at frequencies greater than about 1,000 Hz, in one embodiment for testing at frequencies in a bandwidth of about 0.01 Hz to greater than about 1,000 Hz, in another embodiment for testing at frequencies in a bandwidth of about 0.01 Hz to about 2,000 Hz, and in yet another embodiment for testing at frequencies in a bandwidth of about 0.01 Hz to about 3,000 Hz.

Another aspect is the dual use of the PE actuator/sensor. As mentioned above, the characteristic mostly studied during this form of testing is the dynamic stiffness. This stiffness is derived from a measurement or estimation (in the truest sense, a transducer measurement is only an "estimation" of a physical quantity) of the displacement and the force. The displacement estimate is often derived from an LVDT or an encoder at low frequencies, and is often derived from an acceleration based measurement at higher frequencies, where the acceleration is estimated from an accelerometer measurement. The acceleration is double integrated to derive the displacement. The force is often estimated from a strain gaged force transducer measurement. Another force transducer sometimes used for this type of testing is a piezoelectric force transducer. In a PE force transducer, the rate of change of force is proportional to the electrical charge emitted from the PE element. Also note that the strain (which is proportional to displacement) of the PE actuator is proportional to the voltage applied to the PE actuator element.

Another aspect of the invention is to accurately measure the current/charge within the PE actuator motor amplifier which is delivered to the PE actuator during the test excitation. Then from this current/charge measurement, estimate the force produced by the PE actuator. The advantage of this combination PE actuator/sensor is that the component costs can be reduced since the PE transducer can be eliminated since the PE actuator (along with the current/charge measurement) can perform this function.

In one embodiment, a test system includes a frame and a hydraulic actuator mounted to the frame and configured to support a test specimen. A piezoelectric actuator is configured to apply a force to the test specimen; and a controller is configured to excite the piezoelectric actuator and provide an indication of force generated by piezoelectric actuator by measurement of current or charge provided to the piezoelectric actuator.

In another embodiment, a test system includes a frame and a hydraulic actuator mounted to the frame and configured to support a test specimen, the hydraulic actuator having a movable element such as a piston rod. An inertial mass is coupled to the movable element to move therewith. A piezoelectric actuator is mounted to the inertial mass on a side opposite the movable element. The piezoelectric actuator is configured to apply a force to the test specimen. The test system also includes a controller configured to control operation of the hydraulic actuator and excite the piezoelectric actuator.

Implementations of the foregoing may include one or more of the following features. The test system where the piezoelectric actuator is connected in series with the hydraulic actuator. A load cell can be provided and configured to connect to the test specimen on a side opposite of the hydraulic actuator. In another embodiment, a mass is configured to connect to the test specimen on a side opposite of the hydraulic actuator and a load cell connected to the second mass. The foregoing structure allows the controller to operate the hydraulic actuator and piezoelectric actuator for test specimen testing at frequencies greater than about 1,000 hz, and in a further embodiment at frequencies in a bandwidth of about 0.01 hz to greater than about 1,000 hz, and in a further embodiment at frequencies in a bandwidth of about 0.01 hz to greater than about 2,000 hz, and in yet a further embodiment at frequencies in a bandwidth of about 0.01 hz to greater than about 3,000 hz.

DETAILED DESCRIPTION OF ILLUSTRATIVE EMBODIMENT

Figure 1:
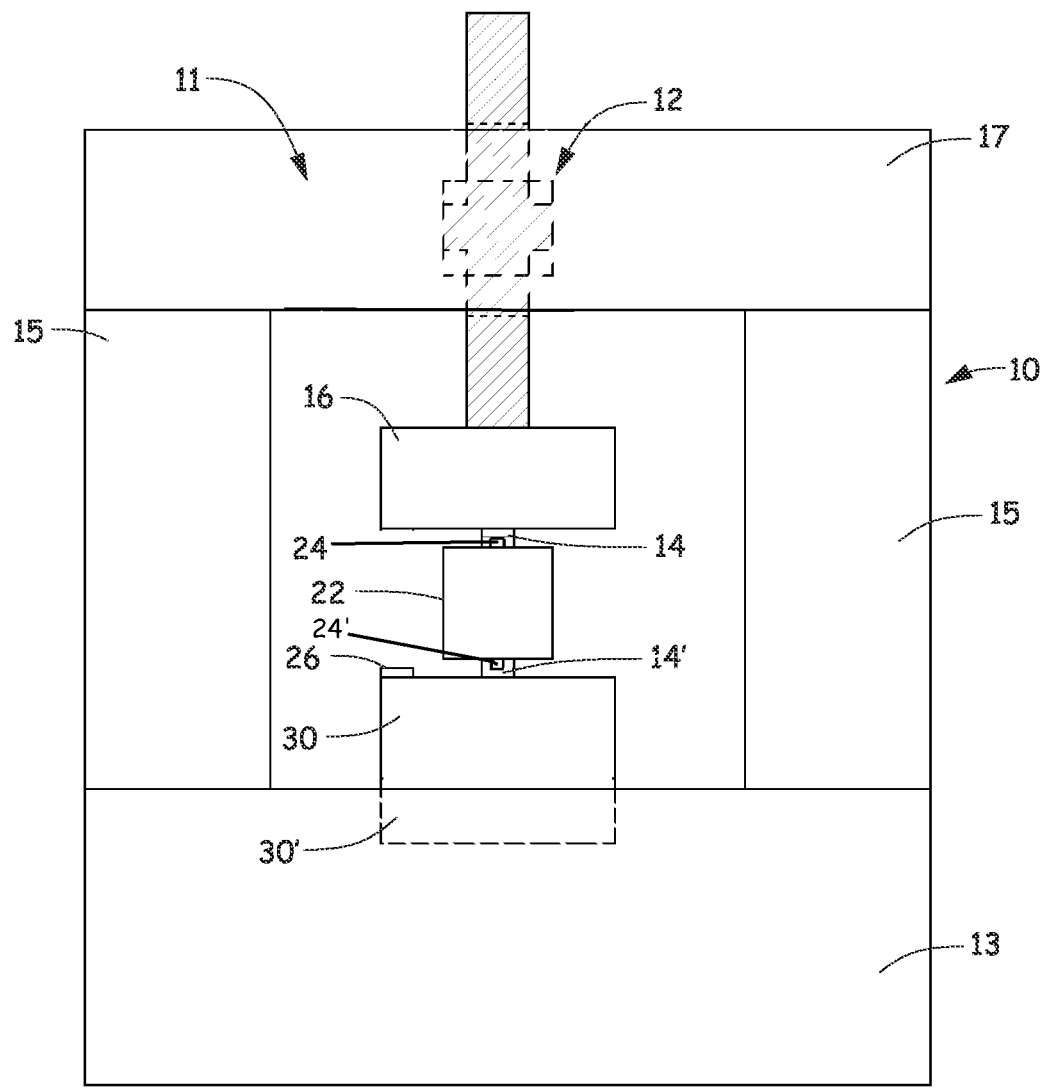
FIG. 1 is a schematic representation of an exemplary testing machine.
Figure 2:
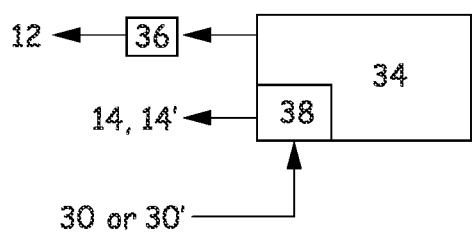
FIG. 2 is a schematic representation of a controller of the testing machine of FIG. 1.

Referring to the figures, an exemplary embodiment of a combination PE and hydraulic actuator system 10 is integrated into a typical servo-hydraulic testing system 11 such as the MTS 831.50, manufactured by MTS Systems Corporation of Eden Prairie, Minn. The test system 11 includes a frame 10 having herein a base 13 and two columns 15 that support a crosshead 17. Generally, the system 11 includes a hydraulic actuator 12 (herein mounted in the crosshead 17 by way of example) and a PE actuator 14. In this exemplary embodiment, an inertial mass 16 is attached to a piston rod 18 of the hydraulic actuator 12 to provide an inertial reaction for the PE actuator 14. The PE actuator 14 can be disposed in series between inertial mass 16 above a specimen under test (SUT) 22 and/or the PE actuator can be secured to the SUT 22 as shown in the FIG. 1 at 14' on a side opposite the inertial mass 16 with an accelerometer 24' in series with the PE actuator 14' and the SUT 22. For the high frequency testing, the accelerometer(s) 14, 14' can be used for a displacement estimation. Accelerometers 24, 24' can be used to derive a relative acceleration hence relative displacement across the SUT 22 as described in United States Published Patent Application 2016/0202160, which is incorporated herein by reference in its entirety.

Since a PE transducer cannot measure to very low frequencies, another transducer such as a strain gage load cell 30 is provided. If desired, an accelerometer 26 can also be mounted to the load cell 30 and used for force transducer acceleration compensation as described in U.S. Pat. Nos. 7,331,209 or 9,658,122, which are incorporated herein by reference in their entirety.

The load cell transducer 30 can be located under the optional PE actuator/transducer 14' which is under the SUT 22. In another embodiment, it may be desirable to include another inertial mass directly under the lower optional PE actuator/transducer 14' in which case the load cell can be located 30' and the inertial mass is then represented by reference 30. Or alternatively a delta P transducer can be used to measure fluid pressure on opposite side of the piston of the actuator 12 and the load cell can be removed entirely. It should be noted in yet another embodiment, multiple PE actuator/transducers can be used. For instance, both PE actuator/transducer 24 and 24' can be used as illustrated. Likewise, multiple PE actuator/transducers can be used in series where indicated at 14 or 14'.

A controller 34 controls operation of the hydraulic actuator 12 and PE actuator/transducer 14. As is well known in the art, the controller 34 typically controls operation of the hydraulic actuator 12 by providing control signals to a servovalve 36 that in turn controls fluid flow to the hydraulic actuator 12. The controller 34 directly or indirectly through an interface module (actuator amplifier) excites the PE actuator(s) in the system 11. The current/charge delivered by the PE actuator motor amplifier to the PE actuator during test excitation is measured. In one embodiment, the current to each of the PE actuator/transducers 14, 14' is measured by a current sensor, the signal of which is integrated over time so as to provide a total charge measurement. To avoid drift the current signal is provided to a high pass filter and then integrated. Then from this total charge measurement, the controller 34 estimate the force produced by the PE actuator from a believed linear relationship, although any nonlinearities can also be taken into account if present. The strain, which is proportional to displacement, can be ascertained by measuring the voltage applied to the PE actuators 14, 14'.

Although the present invention has been described with reference to preferred embodiments, workers skilled in the art will recognize that changes may be made in form and detail without departing from the spirit and scope of the invention.

What is claimed is:

1. A test system comprising:
a frame;
a hydraulic actuator mounted to the frame configured to provide a force to a test specimen;
a piezoelectric actuator configured to apply a second force to the test specimen; and
a controller configured to excite the piezoelectric actuator and provide an indication of the second force generated by the piezoelectric actuator by measurement of current or charge provided to the piezoelectric actuator.

2. The test system of claim 1 wherein the piezoelectric actuator is connected in series with the hydraulic actuator.

3. The test system of claim 1 and a load cell configured to measure force applied to the test specimen.

4. The test system of claim 1 and a mass connected to a piston rod of the hydraulic actuator.

5. The test system of claim 4 and a load cell supported on the frame on a side opposite of the hydraulic actuator, the load cell configured to measure and provide an input signal to the controller indicative of the force applied to the test specimen.

6. The test specimen of claim 5 and a second mass configured to connect to the test specimen on a side opposite of the hydraulic actuator and a second load cell connected to the second mass.

7. The test system of claim 1 wherein the controller is configured to operate the hydraulic actuator and piezoelectric actuator for test specimen testing at frequencies greater than or equal to 1,000 Hz.

8. The test system of claim 1 wherein the controller is configured to operate the hydraulic actuator and piezoelectric actuator for test specimen testing at frequencies in a bandwidth of 0.01 Hz to greater than 1,000 Hz.

9. The test system of claim 1 wherein the controller is configured to operate the hydraulic actuator and piezoelectric actuator for test specimen testing at frequencies in a bandwidth of 0.01 Hz to greater than 2,000 Hz.

10. The test system of claim 1 wherein the controller is configured to operate the hydraulic actuator and piezoelectric actuator for test specimen testing at frequencies in a bandwidth of 0.01 Hz to greater than 3,000 Hz.

11. The test system of claim 1 wherein the frame comprises a base and two support columns supporting a crosshead over the base.

12. The test system of claim 11 wherein the hydraulic actuator is located in the crosshead.

13. The test system of claim 1 and further comprising an inertial mass coupled to a piston rod of the hydraulic actuator to move therewith, and wherein the piezoelectric actuator is mounted to the inertial mass, and wherein the piezoelectric actuator supports the test specimen on a side opposite the inertial mass.

14. A test system comprising:
   a frame;
   a hydraulic actuator mounted to the frame configured to provide a force to a test specimen, the hydraulic actuator having a piston and being mounted in a crosshead;
   an inertial mass coupled to the piston to move therewith;
   a piezoelectric actuator mounted to the inertial mass on a side opposite the piston, the piezoelectric actuator configured to apply a second force to the test specimen; and
   a controller configured to control operation of the hydraulic actuator, excite the piezoelectric actuator and provide an indication of the second force generated by the piezoelectric actuator by measurement of current or charge provided to the piezoelectric actuator.

15. The test system of claim 14 and further comprising a load cell supported on the frame on a side opposite of the hydraulic actuator, the load cell configured to measure and provide an input signal to the controller indicative of a force applied to the test specimen.

16. The test system of claim 15 and further comprising a second inertial mass connected to the load cell on a side opposite the frame.

17. The test system of claim 16 and further comprising a piezoelectric transducer connected to the second inertial mass on a side opposite the load cell, the piezoelectric transducer configured to measure and provide a second input signal to the controller indicative of the force applied to the test specimen.

18. The test system of claim 14 wherein the controller is configured to operate the hydraulic actuator and piezoelectric actuator for test specimen testing at frequencies greater than or equal to 1,000 Hz.

19. The test system of claim 14 wherein the controller is configured to operate the hydraulic actuator and piezoelectric actuator for test specimen testing at frequencies in a bandwidth of 0.01 Hz to greater than 2,000 Hz.

* * * * *